United States Patent [19]

Matsuda

[11] Patent Number: 4,986,388
[45] Date of Patent: Jan. 22, 1991

[54] DRIVING FORCE DISTRIBUTION CONTROL SYSTEM FOR 4WD VEHICLE

[75] Inventor: Toshiro Matsuda, Sagamihara, Japan

[73] Assignee: Nissan Motor Co., Ltd., Yokohama, Japan

[21] Appl. No.: 496,403

[22] Filed: Mar. 20, 1990

[30] Foreign Application Priority Data

Apr. 10, 1989 [JP] Japan ................................. 1-89968

[51] Int. Cl.⁵ ...................... B60K 23/08; G06F 13/10; G06G 7/63
[52] U.S. Cl. .................................. 180/248; 180/233; 364/424.1
[58] Field of Search ....................... 180/233, 248, 249; 364/424.1

[56] References Cited

U.S. PATENT DOCUMENTS

| | | | |
|---|---|---|---|
| 4,754,834 | 7/1988 | Ozaki et al. | 180/233 |
| 4,757,870 | 7/1988 | Torii et al. | 180/233 |
| 4,773,500 | 9/1988 | Naito et al. | 180/233 |
| 4,776,424 | 10/1988 | Naito | 180/233 |
| 4,846,298 | 7/1989 | Naito | 180/233 |
| 4,874,056 | 10/1989 | Naito | 180/233 |
| 4,887,689 | 12/1989 | Naito | 180/233 |

FOREIGN PATENT DOCUMENTS

63-203421 8/1988 Japan.

*Primary Examiner*—Charles A. Marmor
*Assistant Examiner*—Kevin Hurley
*Attorney, Agent, or Firm*—Foley & Lardner, Schwartz, Jeffery, Schwaab, Mack, Blumenthal & Evans

[57] ABSTRACT

A control system for a 4WD vehicle includes a drive system for directly transmitting a torque to primary drive wheels, and transmitting a torque to secondary drive wheels through a torque distributing clutch, at least one sensor for determining a front and rear wheel speed difference, at least one sensor for determining a lateral acceleration, and a control unit for controlling the engagement force of the clutch. When the primary wheel speed is lower than the secondary wheel speed, the control unit holds the clutch engagement force equal to zero to improve the steering response until the absolute value of the wheel speed difference reaches a predetermined level, and increase the clutch engagement force in accordance with the absolute value of the wheel speed difference to improve the vehicle stability after the absolute value of the wheel speed difference exceeds the predetermined level.

18 Claims, 8 Drawing Sheets

DRIVING FORCE DISTRIBUTION CONTROL SYSTEM FOR 4WD VEHICLE

BACKGROUND OF THE INVENTION

The present invention relates to a control system for continuously controlling a driving force distribution between front and rear wheels of a four wheel drive vehicle, and more specifically to a driving force distribution control system which can provide an adequate control performance during deceleration.

Japanese Patent Provisional (unexamined, KOKAI) Publication No. 63-203421 shows a conventional example. A driving force distribution control system of this example is designed to increase an engagement force of a transfer clutch to increase a driving force transmitted to the front wheels in accordance with a front and rear wheel speed difference when a drive wheel slip is produced during acceleration or driving on a slippery road, and varies a gain (rate of increase) of the clutch engagement force in accordance with the lateral acceleration of the vehicle.

This system holds the clutch engagement force equal to zero irrespective of the front and rear wheel speed difference during deceleration during which the rear wheels which are directly connected with the engine becomes lower than the rotational speed of the front wheels which are connected with the engine through the transfer clutch. When, therefore, the vehicle is decelerated during a turn, there is produced a moment tending to turn the vehicle in the steering direction because of a vehicle roll causing a displacement of the center of gravity of the vehicle toward the outside of the turning arc, and a braking force applied on each rear wheel. This system can improve the steering response of the vehicle in yawing motion by producing this moment. However, this system is not designed to control this moment. If this moment increases too much, the possibility of drift-out or tack-in or vehicle spin is increased, and the directional stability of the vehicle becomes poor.

SUMMARY OF THE INVENTION

It is an object of the present invention to provide a driving force distribution control system which can improve both the steering response and the directional stability during deceleration.

According to the present invention, a driving force distribution control system for a vehicle comprises a torque distributing means, a wheel speed determining means, a lateral acceleration determining means and a driving force distribution controlling means. The torque distributing means comprises a primary drive means for transmitting a driving force from an engine to primary drive wheels of the vehicle, and a secondary drive means for transmitting a driving force from the engine to secondary drive wheels of the vehicle through a torque distributing clutch which is capable of varying the driving force transmitted to the secondary drive wheels in response to a control signal. The wheel speed difference determining means determines a wheel speed difference which is a difference between a primary wheel speed of the primary drive wheels, and a secondary wheel speed of the secondary drive wheels. The lateral acceleration determining means determines a lateral acceleration of the vehicle. The driving force distribution controlling means produces the control signal to control the torque distributing clutch, and comprises a first operational means for increasing the control signal in accordance with the wheel speed difference, and a second operational means for holding the control signal equal to zero when the lateral acceleration is higher than a predetermined value, and the wheel speed difference is within a dead band range in which the primary wheel speed is lower than the secondary wheel speed, and an absolute value of the wheel speed difference is smaller than a predetermined level. The second operational means may comprise an increasing means for increasing the control signal with an increase in the absolute value of the wheel speed difference when the primary wheel speed difference is lower than the secondary wheel speed, and the absolute value of the wheel speed difference is greater than the level.

Figure 1:
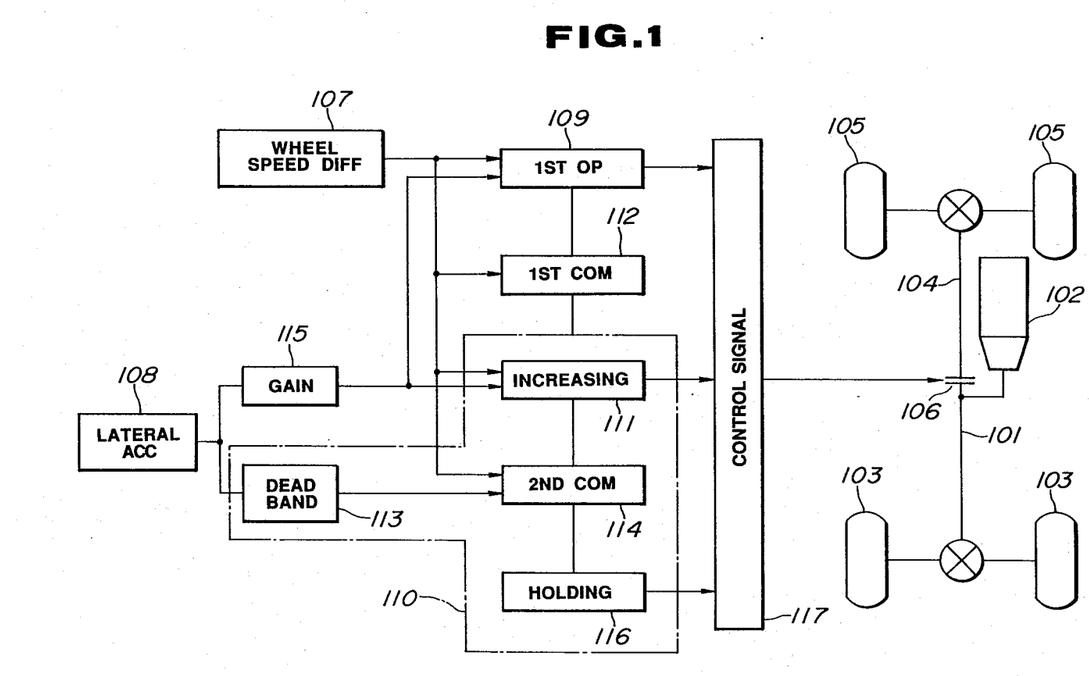
FIG. 1 is a schematic view showing, as an example, one arrangement of the control system according to the present invention.

FIG. 1 shows, as an example, an arrangement of the control system according to the present invention, in order to facilitate understanding the claims of the present application. The control system of this example comprises the torque distributing means which comprises the primary drive means 101 for transmitting the driving force to the primary drive wheels 103, and the secondary drive means 104 for transmitting the driving force to the secondary drive wheels 105 through the distributing clutch 106, the wheel speed difference determining means 107, the lateral acceleration determining means 108, and the controlling means comprising the first operational means 109 and the secondary operational means 110. The controlling means of the example shown in FIG. 1 further comprises a first comparing means 112, a gain determining means 115 and a control signal producing means 117, and the second operational means 110 of this example comprises an increasing means 111, a dead band determining means 113, a second comparing means and a holding means 116.

In the example shown in FIG. 1, the first operational means 109 controls the magnitude of the control signal only when the primary wheel speed is equal to or higher than the secondary wheel speed, the secondary operational means 110 controls the magnitude of the control signal only when the primary wheel speed is lower than the secondary wheel speed, and the first comparing means 112 determines whether the wheel speed difference is equal to or greater than zero. The dead band determining means 113 determines the level in accordance with the lateral acceleration, and the second comparing means 114 determines whether the wheel speed difference is within the dead band range. The increasing means 111 increases the control signal in accordance with the absolute value of the wheel speed difference when the primary wheel speed is lower than the secondary wheel speed and at the same time the wheel speed difference is outside the dead band, and the holding means 116 holds the control signal equal to zero when the wheel speed difference is within the dead band range. The control signal producing means 117 produces the control signal in accordance with one of the output signals of the first operational means 109, the increasing means 111 and the holding means 116. The gain determining means 115 determines a gain used in the first operational means and the increasing means, in accordance with the lateral acceleration.

DETAILED DESCRIPTION OF THE INVENTION

A first embodiment of the present invention is shown in FIGS. 2-6.

Figure 2:
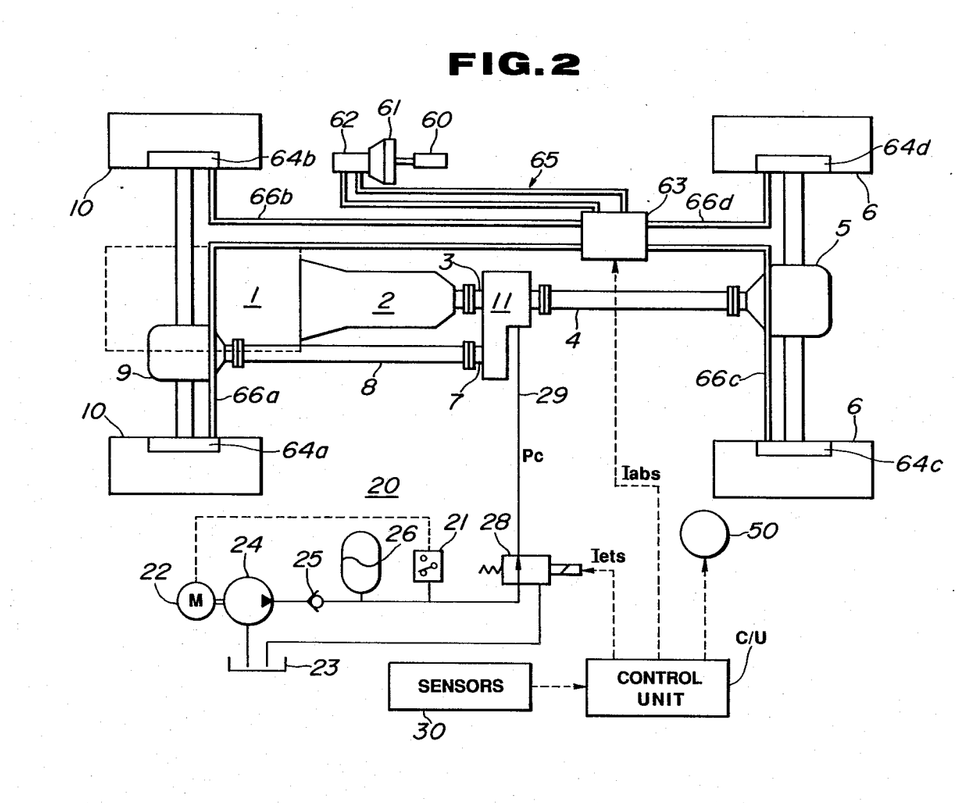
FIG. 2 is a schematic view showing a first embodiment of the present invention.

FIG. 2 shows a 4WD vehicle equipped with both a torque split control system (driving force distribution control system) and an anti-lock four wheel brake control system (wheel slip brake control system).

The vehicle has a drive system which includes an engine 1, a transmission 2, a transfer input shaft 3, a rear propeller shaft 4, a rear differential 5, rear wheels 6, a transfer output shaft 7, a front propeller shaft 8, a front differential 9, front wheels 10, and a transfer 11. In this embodiment, the rear wheels 5 are primary drive wheels, and the front wheels 10 are secondary drive wheels. From the transmission 2, engine torque is transmitted to the rear wheels 6 through a rear drive line which serves as a primary drive means for transmitting engine torque directly to the primary drive wheels, and transmitted to the front wheels 10 through a front drive line which serves as a secondary drive means having a torque distribution clutch (or a transfer clutch). In this embodiment, the torque distribution clutch is a wet type multiple disc clutch provided in the transfer 11. Therefore, the engine torque is transmitted directly to the rear wheels 6. On the other hand, the engine torque is transmitted to the front wheels 10 through the torque distributing clutch which is capable of continuously varying the torque transmitted to the front wheels, and completely disconnecting the front wheels 10 from the engine 1. The transfer and its torque distributing clutch are illustrated and explained in more detail in commonly assigned U.S. Pat. Nos. 4,754,834; 4,757,870; 4,773,500; 4,776,424; 4,846,298; 4,874,056 and 4,887,689, and commonly assigned U.S. applications Ser. Nos. 07/254,875; 07/255,820; 07/277,377 and 07/255,939. The related explanations and figures of these patents are herein incorporated by reference.

The torque split (driving force distribution) control system further includes a hydraulic system 20 for producing a control oil pressure Pc supplied to the distributing clutch, a group of various sensors 30, a control unit C/U, and an alarm indicating device 50. The control unit C/U produces a solenoid drive current signal Iets in accordance with output signals of the sensors 30, and controls the clutch engagement force of the torque distribution clutch of the transfer 11 by sending the solenoid drive signal to a solenoid valve 28 of the hydraulic system 20.

The hydraulic system 20 includes a relief switch 21, a motor 22, an oil reservoir tank 23, an oil pressure pump 24, a check valve 25, an accumulator 26, and the above-mentioned solenoid valve 28. The motor 22 is turned on and off by the relief switch 21, and drives the oil pump 24 which sucks the oil from the reservoir tank 23. The oil pressure discharged from the pump 24 (primary oil pressure) is supplied through the check valve 25, and stored in the accumulator 26. The solenoid valve 28 receives a line pressure (secondary pressure) from the accumulator 26, and produces the control oil pressure Pc in accordance with the solenoid drive current signal Iets sent from the control unit C/U. The control oil pressure Pc is supplied to the torque distributing clutch of the transfer 11 through an oil pipe 29. In this way, the control unit C/U can continuously vary the engagement force of the torque distributing clutch.

Figure 3:
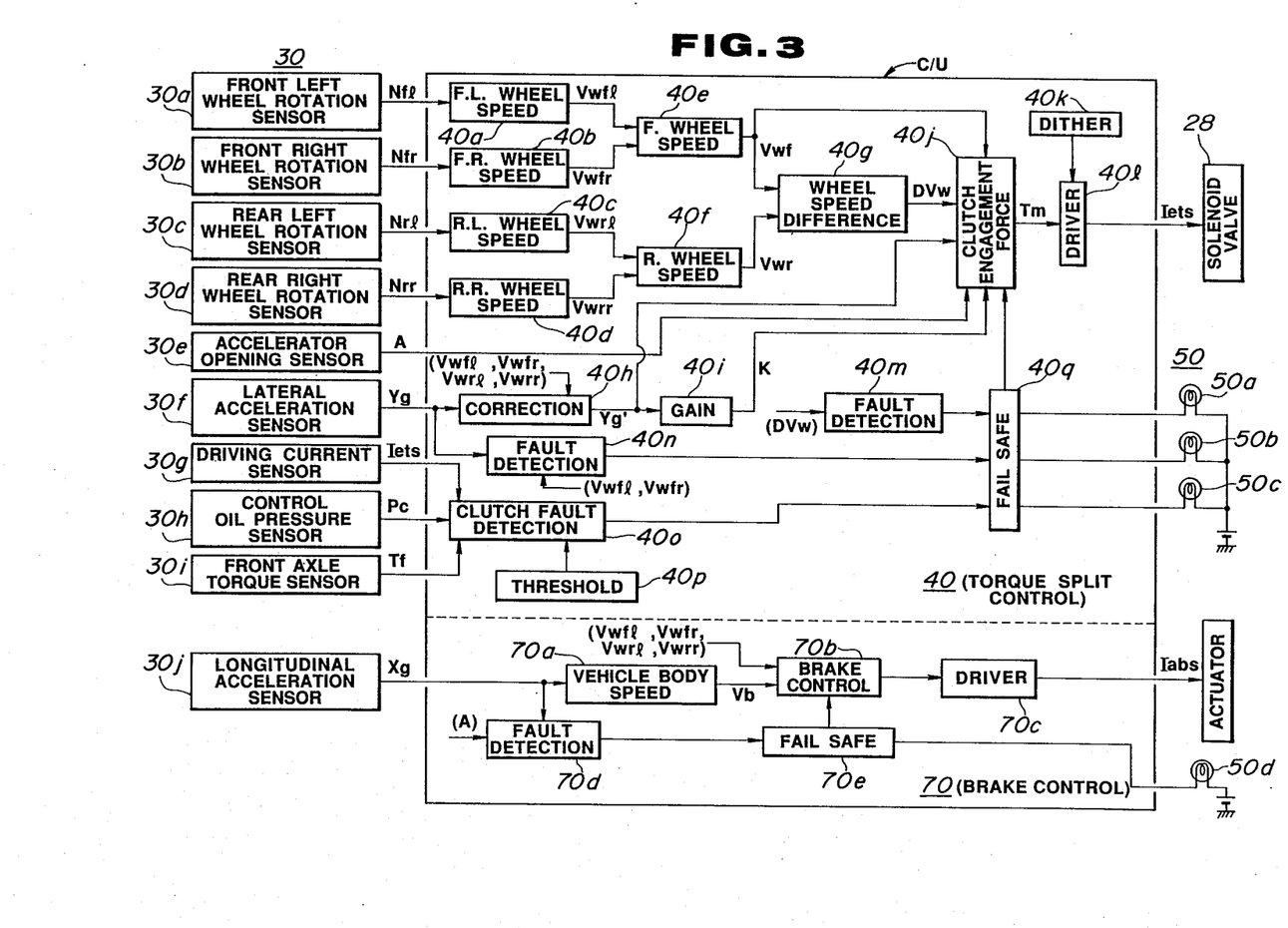
FIG. 3 is a block diagram showing an electronic control unit of the first embodiment.

As shown in FIG. 3, the sensor group 30 of this embodiment includes a front left wheel rotation sensor 30a for sensing the number of revolutions Nfl of the front left wheel 10, a front right wheel rotation sensor 30b for sensing the number of revolutions Nfr of the front right wheel 10, a rear left wheel rotation sensor 30c for sensing the number of revolutions Nrl of the rear left wheel 6, a rear right wheel rotation sensor 30d for sensing the number of revolutions Nrr of the rear right wheel 6, an accelerator opening sensor 30e for sensing an accelerator opening A (i.e. an accelerator position or a throttle opening), a lateral acceleration sensor 30f for sensing a lateral acceleration Yg of the vehicle, a drive current sensor 30g, a control oil pressure sensor 30h, a front axle torque sensor 30i and a longitudinal acceleration sensor 30j for sensing a longitudinal acceleration Xg of the vehicle.

The control unit C/U of this embodiment has a torque split (driving force distribution) control section 40 and an anti-lock brake control section 70, as shown in FIG. 3.

The torque split control section 40 includes a circuit 40a for receiving the signal of the front left wheel rotation sensor 30a and determining a front left wheel speed Vwfl, a circuit 40b for receiving the signal of the front right wheel rotation sensor 30b and determining a front right wheel speed Vwfr, a circuit 40c for receiving the signal of the rear left wheel rotation sensor 30c and determining a rear left wheel speed Vwrl, and a circuit 40d for receiving the signal of the rear right wheel rotation sensor 30d and determining a rear right wheel speed Vwrr. The torque split control section 40 further includes a circuit 40e connected with the circuits 40a and 40b, for determining a front wheel speed Vwf, a circuit 40f connected with the circuits 40c and 40d, for determining a rear wheel speed Vwr, and a circuit 40g connected with the circuits 40e and 40f, for determining a front and rear wheel speed difference DVw. The front wheel speed Vwf is an average (arithmetic mean) of Vwfl and Vwfr, and the rear wheel speed Vwr is an average (arithmetic mean) of Vwrl and Vwrr. In this embodiment, the front and rear wheel speed difference DVw is a difference obtained by subtracting the front wheel speed Vwf (i.e. a secondary wheel speed) from the rear wheel speed Vwr (i.e. a primary wheel speed).

The torque split control section 40 further includes circuits 40h, 40i and 40j. The circuit 40h is connected with the lateral acceleration sensor 30f, and constructed to determine a true lateral acceleration (corrected lateral acceleration) Yg' by compensating an offset amount inherent in the output signal of the lateral acceleration sensor 30f. In this embodiment, the lateral acceleration sensor 30f and the correction circuit 40h serve as the lateral acceleration determining means 108 shown in FIG. 1. The circuit 40i is connected with the circuit 40h, and designed to determine a gain K in accordance with the true lateral acceleration Yg'. The circuit 40j is a circuit for determining a clutch engagement force in accordance with the front and rear wheel speed difference DVw and the gain K.

The torque split control section 40 further includes a circuit 40k for producing a dither signal, a solenoid driver circuit 40l, a fault detection circuit 40m for detecting faults (abnormal conditions) in the output of the wheel speed difference determining circuit 40g, a fault detection circuit 40n for detecting faults in the lateral acceleration sensor 34f, a fault detection circuit 40o for detecting faults in the torque distribution clutch, a circuit 40p for setting at least one threshold value used as a criterion for the diagnostic judgement of abnormality, and a fail-safe circuit 40q.

The alarm indicating device 50 includes an warning lamp 50a for indicating the occurrence of an abnormal condition in the wheel speed difference signal, a warning lamp 50b for indicating the occurrence of an abnormal condition in the lateral acceleration sensor 30f, and a warning lamp 50c for indicating the occurrence of an abnormal condition in the clutch.

As shown in FIG. 2, the brake system of the vehicle includes a brake pedal 60, a brake booster 61, a master cylinder 62, an actuator 63, wheel cylinders 64a, 64b, 64c and 64d, and brake lines (tubings) 65, 66a, 66b, 66c, and 66d.

The anti-lock brake control system is designed to prevent lock-up of each wheel during braking especially in a panic situation or on a low mu road surface by controlling the braking force so as to cause the slip rate (degree of rotational wheel slip) of each wheel obtained from the vehicle body speed and each wheel speed, to approach to the optimum level of about 0.15–0.3. The anti-lock brake control system includes the above-mentioned actuator 63 having a three position selector solenoid valve, and an oil pressure pump motor, and the above-mentioned anti-lock brake control section 70 of the control unit C/U. The anti-lock brake control section 70 produces a brake control signal Iabs to command the actuator 63 to increase, decrease or hold unchanged the brake fluid pressure.

As shown in FIG. 3, the anti-lock brake control section 70 is connected with the longitudinal acceleration sensor 30j, and the individual wheel speed sensors 30a, 30b, 30c and 30d. The brake control section 70 includes a vehicle body speed calculating circuit 70a, an anti-lock brake control circuit 70b, a driver circuit 70c for driving the actutor 63, a fault detection circuit 70d for detecting any faults in the longitudinal acceleration sensor 30j, and a fail-safe circuit 70e. The alarm indicating device 50 further includes a warning lamp 50d for indicating the occurrence of an abnormal condition in the longitudinal acceleration sensor 30j.

Figure 4:
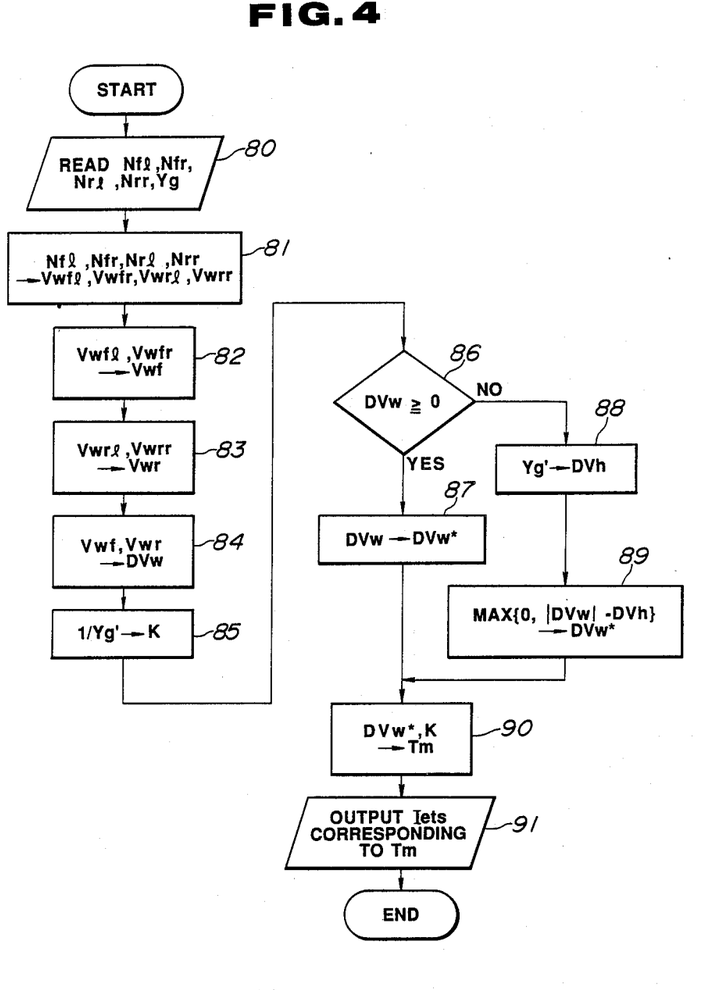
FIG. 4 is a flow chart showing a control procedure of the first embodiment.
Figure 5:
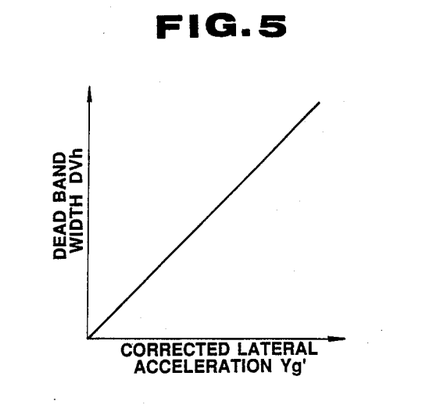
FIG. 5 is a graph showing a relationship of a dead band width with respect to the lateral acceleration, used in the first embodiment.
Figure 6:
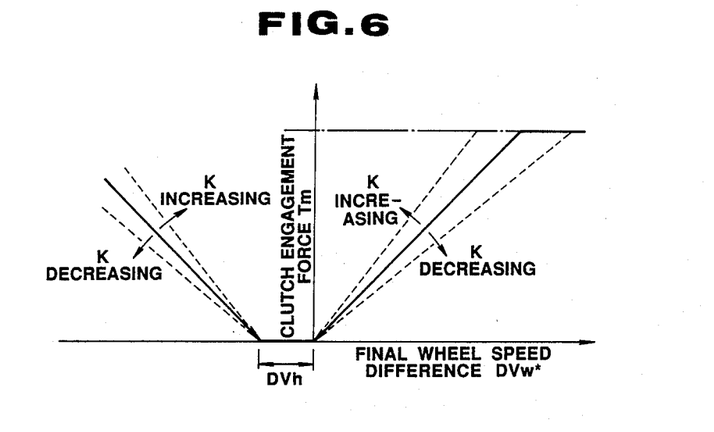
FIG. 6 is a graph showing control characteristics used in the first embodiment.

The torque split control section 40 of the first embodiment controls the driving force distribution according to a control procedure shown in FIG. 4.

At a step 80, the torque split control section 40 reads the sensor signals Nfl, Nfr, Nrl, Nrr and Yg of the four wheel speed sensors 30a, 30b, 30c and 30d, and the lateral acceleration sensor 30f.

At a step 81, the torque split control section 40 computes the front left wheel speed Vwfl from Nfl, the front right wheel speed Vwfr from Nfr, the rear left wheel speed Vwrl from Nrl, and the rear right wheel speed Vwrr from Nrr.

At steps 82 and 83, the control section 40 computes the front wheel speed Vwf from the front left wheel speed Vwfl and the front right wheel speed Vwfr, and then computes the rear wheel speed Vwr from the rear left wheel speed Vwrl and the rear right wheel speed Vwrr.

At a step 84, the control section 40 computes the front and rear wheel speed difference DVw which is a difference obtained by subtracting the front wheel speed Vwf from the rear wheel speed (Dvw = Vwr − Vwf).

At a step 85, the control section 40 determines the gain K which is proportional to the reciprocal of the true lateral acceleration Yg'.

At a step 86, the control section 40 determines whether the front and rear wheel speed difference DVw is equal to or greater than zero. If it is, then the control section 40 proceeds to a step 87. If the wheel speed difference DVw is smaller than zero, then the control section 40 proceeds to steps 88 and 89. The step 86 corresponds to the first comparing means 112 shown in FIG. 1.

At the step 87, the control section 40 sets a final wheel speed difference DVw* equal to the wheel speed difference DVw determined at the step 84. The step 87 corresponds to the first operational means 109 shown in FIG. 1.

At the step 88, the control section 40 determines a dead band width DVh (a predetermined level) in accordance with the true lateral acceleration Yg'. In this embodiment, the control section 40 determines the dead band width DVh by using a relationship between DVh and Yg' shown in FIG. 5. That is, the dead band width DVh is proportional to the true lateral acceleration Yg'. The step 88 corresponds to the dead band determining means 113 shown in FIG. 1.

At the step 89, the control section 40 determines a remainder resulting from subtraction of the dead band width VDh from the absolute value of the wheel speed difference obtained at the step 84, and compares the thus-obtained remainder with zero. If this remainder is smaller than zero, then the control section 40 sets the final wheel speed difference equal to zero. If the remainder is equal to or greater than zero, then the control section 40 sets the final wheel speed difference DVw* equal to the remainder. The step 89 corresponds to the increasing means 111, the second comparing means 114 and the holding means 116.

After the step 87 or 89, the control section 40 proceeds to a step 90, at which a clutch engagement force Tm is determined from the final wheel speed difference DVw* obtained at the step 87 or 89, and the gain K obtained at the step 85. In this embodiment, the control section 40 determines the clutch engagement force Tm by using relationships shown in FIG. 6. In this embodiment, the clutch engagement force Tm is equal to a product obtained by multiplying the wheel speed difference DVw by the gain K when the rear wheel speed Vwr is equal to or higher than the front wheel speed Vwf. When the rear wheel speed Vwr is lower than the front wheel speed Vwf, and the absolute value of the wheel speed difference Dvw is equal to or smaller than the dead band width Dvh (the predetermined level), then the clutch engagement force Tm is equal to zero. When the rear wheel speed Vwr is lower than the front wheel speed VWf, and at the same time the absolute value of the wheel speed difference DVw is greater than the dead band width DVh, then the clutch engagement force Tm is equal to a product obtained by multiplying the remainder that remains after the dead band width DVh is subtracted from the absolute value of the wheel speed difference DVw, by the gain K.

At a step 91, the control section 40 delivers the solenoid driving current Iets to the solenoid valve 28 to achieve the clutch engagement force Tm determined at the step 90. The steps 90 and 91 correspond to the control signal producing means 117 shown in FIG. 1.

The drive wheels tend to slip when the accelerator pedal is depressed to start or accelerate the vehicle or when the vehicle is driven on a slippery road. When such a drive wheel slip occurs, the front and rear wheel speed difference DVw becomes positive, and the control section 40 follows the sequence of steps 86-87-90-91. Therefore, the torque split control section 40 increases the front driving force transmitted to the front wheels 10 by increasing the clutch engagement force Tm of the torque distributing clutch as the front and rear wheel speed difference DVw increases, and by so doing prevents slippage of the rear wheels 6. When the vehicle is moving on a road of a high friction coefficient where the lateral acceleration tends to become high, the torque split control section 40 decreases the gain K with increase of the lateral acceleration, and prevents the undesired tight corner braking. On a road surface where the friction coefficient is so low that the lateral acceleration is low and the tight corner braking is not influential, the torque split control section 40 increases the gain K, and minimizes the possibility of drive wheel slip by increasing the tendency to the four wheel drive mode.

When the vehicle speed is decreased by releasing the accelerator pedal during a turn of the vehicle, the braking force is applied on the rear wheels 6 directly connected with the engine, by the braking effect of the engine, and the rear wheel speed Vwr becomes lower than the front wheel speed Vwf. Therefore, the front and rear wheel speed difference DVw becomes negative, and the control section 40 follows the sequence of steps 86-88-89-90-91. During a turn accompanied by deceleration, therefore, the control section 40 produces a dead band whose width (which is a difference between the largest and smallest values in the range of the dead band) is proportional to the true lateral acceleration Yg'. In the early stage of a turn in which the absolute value of the front and rear wheel speed difference DVw is so small that the wheel speed difference DVw remains in the dead band, the control section 40 decreases the clutch engagement force Tm to zero to fully disengage the torque distribution clutch, and holds the drive system of the vehicle in the rear two wheel drive state in which the driving force is transmitted only to the rear wheels. In this state, there arises a moment tending to turn the vehicle in the steering direction because of a vehicle body roll causing the center of gravity of the vehicle to displace toward the outside of the turning arc, and the braking force produced in the left and right rear wheels. As a result, the steering response characteristic of the vehicle in yawing motion is improved.

In the middle and later stages of the turn in which the absolute value of the wheel speed difference DVw exceeds the dead band width DVh, the control section 40 increases the clutch engagement force Tm, and varies the driving torque distribution toward the four wheel drive state as the absolute value of the wheel speed difference DVw increases. Therefore, the directional stability of the vehicle is improved because a moment in the direction toward tack-in on the rear wheels' side is counteracted by a moment in the opposite direction produced on the front wheel's side.

Furthermore, the control system of this embodiment can adapt the balance between the steering response (or sensitivity) and the direction stability of the vehicle, to the friction coefficient of a road surface, by increasing the dead band width DVh in accordance with the lateral acceleration. On a dry paved road having a high friction coefficient where the tire's ability of gripping the road surface is high and the lateral acceleration of the vehicle becomes high, the control system increases the dead band width DVh, and provides a superior steering response in yawing motion by increasing the moment in the direction toward tack-in. When the friction coefficient is low because of rain or snow, the control system decreases the dead band width DVh, and increases the directional stability of the vehicle.

Figure 7:
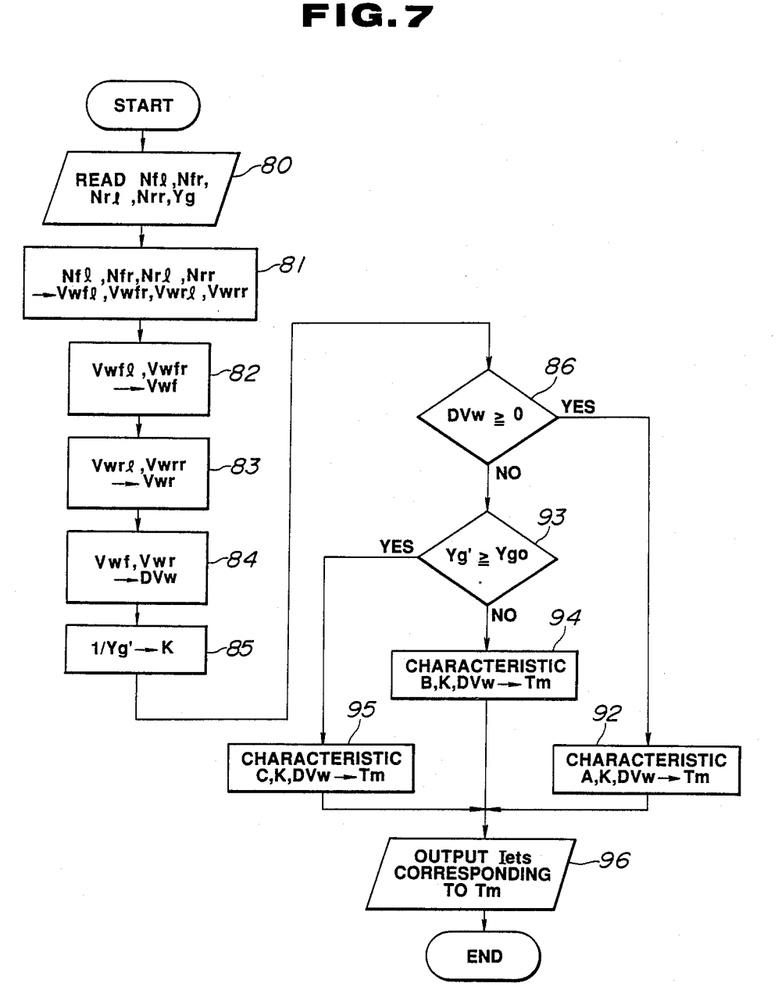
FIG. 7 is a flow chart showing a control procedure of a second embodiment of the present invention.

A second embodiment of the present invention is shown in FIG. 7. In the second embodiment, the dead band is produced only when the lateral acceleration is higher than a predetermined value which is greater than zero.

The torque split (driving force distribution) control system of the second embodiment is almost the same as the control system of the first embodiment. FIG. 7 shows the control procedure followed by the torque split control section 40 of the second embodiment.

Steps 80–86 of FIG. 7 are identical to the steps 80–86 of FIG. 4, respectively. If the front and rear wheel speed difference DVw is equal to or greater than zero, then the torque split control section 40 of the second embodiment proceeds from the step 86 to a step 92. If the wheel speed difference DVw is smaller than zero, then the control section 40 proceeds from the step 86 to a step 93.

Figure 8:
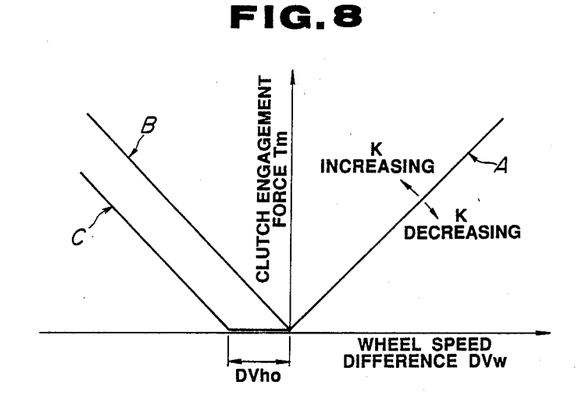
FIG. 8 is a graph showing control characteristics of the second embodiment.

At the step 92, the control section 40 computes the clutch engagement force Tm by using a characteristic A shown in FIG. 8, the gain K determined at the step 85, and the wheel speed difference DVw determined at the step 84.

At the step 93, the control section 40 determines whether the true lateral acceleration Yg' is equal to or greater than a predetermined threshold value Ygo. If Yg' is smaller than Ygo, then the control section 40 proceeds to a step 94. If Yg' is equal to or greater than Ygo, then the control section 40 proceeds to a step 95. At the step 94, the control section 40 computes the clutch engagement force Tm by using a characteristic B shown in FIG. 8, the gain K determined at the step 85, and the wheel speed difference DVw determined at the step 84. At the step 95, the control section 40 computes the clutch engagement force Tm by using a characteristic C shown in FIG. 8, the gain K determined at the step 85, and the wheel speed difference DVw determined at the step 84.

Figure 9:
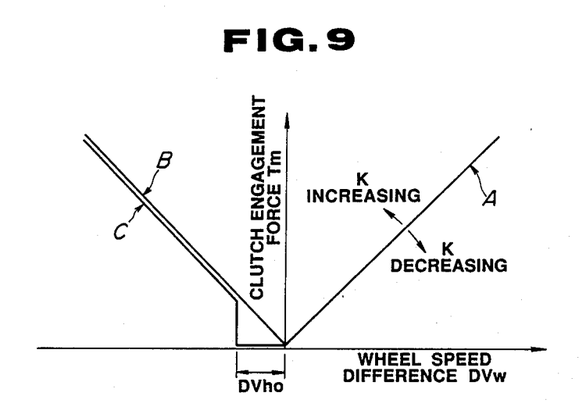
FIG. 9 is a graph showing control characteristics which can be used in the present invention in place of the characteristics of FIG. 8.
Figure 10:
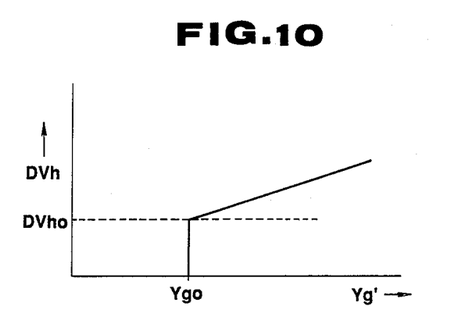
FIGS. 10 and 11 are graphs showing relationships between the dead band width and the lateral acceleration, which can be used in the second embodiment.
Figure 11:
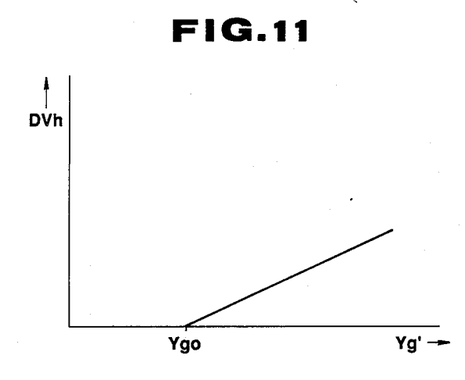

It is possible to employ a characteristic C shown in FIG. 9, instead of the characteristic C shown in FIG. 8. In the characteristic C of FIG. 9, the clutch engagement force Tm is increased abruptly in order to further improve the stability of the vehicle when the wheel speed difference DVw reaches the dead band width DVho, and the clutch engagement force Tm is made equal to a product obtained by multiplying the absolute value of the wheel speed difference DVw by the gain K when the rear wheel speed is smaller than the front wheel speed by the difference which is greater than the dead band width DVho.

At a step 96, the control section 40 delivers the solenoid driving current Iets to the solenoid valve 28 to achieve the clutch engagement force Tm determined at the step 92, 94 or 95.

The present invention is also applicable to a 4WD vehicle in which the front wheels are the primary driving wheels and the rear wheels are the secondary driving wheels.

What is claimed is:

1. A driving force distribution control system for a vehicle, comprising:
    a torque distributing means comprising a primary drive means for transmitting a driving force from an engine of the vehicle to primary drive wheels of the vehicle, and a secondary drive means for transmitting a driving force from the engine to secondary drive wheels of the vehicle through a torque distributing clutch capable of varying the driving force transmitted to the secondary drive wheels in accordance with a control signal,
    said secondary drive means transmitting zero driving force to said secondary wheels when said control signal is zero increasing said drive force to said secondary wheels as said control signal increases.
    a means for determining a wheel speed difference which is a difference between a primary wheel speed of the primary drive wheels and a secondary wheel speed of the secondary drive wheels,
    a means for determining a lateral acceleration of the vehicle, and
    a driving force distribution controlling means for producing said control signal, said controlling means comprising a first operational means for increasing said control signal in accordance with said wheel speed difference, and a second operational means for holding said control signal equal to zero when said lateral acceleration is higher than a predetermined value, and said wheel speed difference is within a predetermined dead band range in which said primary wheel speed is lower than said secondary wheel speed and an absolute value of said wheel speed difference is smaller than a predetermined level.

2. A driving force distribution control system according to claim 1 wherein said second operational means comprises an increasing means for increasing said control signal with increase in the absolute value of said wheel speed difference when said primary wheel speed is lower than said secondary wheel speed, and the absolute value of said wheel speed difference is greater than said predetermined level.

3. A driving force distribution control system according to claim 2 wherein said controlling means further comprises a first comparing means for determining whether said wheel speed difference is equal to or greater than zero.

4. A driving force distribution control system according to claim 3 wherein said first comparing means is connected with said first operational means for enabling said first operational means to vary said control signal only when said primary wheel speed is equal to or higher than said secondary wheel speed, and said first comparing means is further connected with said second operational means for enabling said second operational means to vary said control signal only when said primary wheel speed is lower than said secondary wheel speed.

5. A driving force distribution control system according to claim 4 wherein said second operational means further comprises a dead band determining means for determining said predetermined level in accordance with said lateral acceleration.

6. A driving force distribution control system according to claim 5 wherein said second operational means further comprises a second comparing means for determining whether said wheel speed difference is within said dead band range.

7. A driving force distribution control system according to claim 6 wherein said dead band determining means includes a means for producing a dead band width signal representing said predetermined level which is increased in proportion to said lateral acceleration, and said predetermined value of said lateral acceleration is equal to zero.

8. A driving force distribution control system according to claim 6 wherein said dead band determining means includes a means for producing a dead band width signal representing said predetermined level which is equal to zero when said lateral acceleration is lower than said predetermined value and which is greater than zero when said lateral acceleration is greater than said predetermined value.

9. A driving force distribution control system according to claim 8 wherein said dead band determining means includes a means for holding said dead band width signal constant when said lateral acceleration is greater than said predetermined value.

10. A driving force distribution control system according to claim 8 wherein said dead band determining means includes a means for increasing said dead band width signal with increase in said lateral acceleration when said lateral acceleration is greater than said predetermined value.

11. A driving force distribution control system according to claim 6 wherein said controlling means further comprises a gain determining means for determining a gain which decreases as said lateral acceleration increases, and said controlling means increases said control signal in accordance with said wheel speed difference in such a manner that an increase in the magnitude of said control signal is equal to a product obtained by multiplying an increase in the absolute value of said wheel speed difference by said gain.

12. A driving force distribution control system according to claim 11 wherein said first operational means includes a means for producing a first intermediate signal whose magnitude is proportional to the absolute value of said wheel speed difference, said increasing means of said second operational means includes a means for producing a second intermediate signal whose magnitude is increased linearly with increase in the absolute value of said wheel speed difference, and said second operational means further comprises a holding means for producing a null signal whose magnitude is equal to zero.

13. A driving force distribution control system according to claim 12 wherein said controlling means further comprises a control signal producing means for producing said control signal whose magnitude is equal to a product obtained by multiplying said first intermediate signal by said gain when said primary wheel speed is equal to or higher than said secondary wheel speed, equal to a product obtained by multiplying said null signal by said gain when said wheel speed difference is equal to any value within said dead band range, and equal to a product obtained by multiplying said second intermediate signal by said gain when said primary wheel speed is lower than said secondary wheel speed and said wheel speed difference is outside said dead band range, and wherein the magnitude of said first intermediate signal is equal to the absolute value of said wheel speed difference, and the magnitude of said second intermediate signal is equal to a difference resulting from subtraction of said level from the absolute value of said wheel speed difference.

14. A driving force distribution control system according to claim 13 wherein said dead band determining means includes a means for producing a dead band width signal which represents said predetermined level and which has a magnitude proportional to said lateral acceleration.

15. A driving force distribution control system according to claim 12 wherein said dead band determining means includes a means for producing a dead band width signal which represents said predetermined level and has a magnitude which is equal to zero when said lateral acceleration is lower than said predetermined value that is greater than zero, and which is greater than zero when said lateral acceleration is greater than said predetermined value.

16. A driving force distribution control system according to claim 15 wherein said controlling means further comprises a control signal producing means for producing said control signal which is set equal to said first intermediate signal when said primary wheel speed is equal to or higher than said secondary wheel speed, which is set equal to said second intermediate signal when said primary wheel speed is lower than said secondary wheel speed and the absolute value of said wheel speed difference is greater than the magnitude of said dead band width signal, and which is set equal to said null signal when said wheel speed difference is within said dead band range, and wherein the magnitude of said first intermediate signal is equal to a product obtained by multiplying the absolute value of said wheel speed difference by said gain, and the magnitude of said second intermediate signal is equal to a product obtained by multiplying a difference resulting from subtraction of the magnitude of said dead band width signal from the absolute value of said wheel speed difference, by said gain.

17. A driving force distribution control system according to claim 14 wherein said controlling means further comprises a control signal producing means for producing said control signal which is set equal to said first intermediate signal when said primary wheel speed is equal to or higher than said secondary wheel speed, which is set equal to said second intermediate signal when said primary wheel speed is lower than said secondary wheel speed and said wheel speed difference is outside said dead band range, and which is set equal to said null signal when said wheel speed difference is within said dead band range, and wherein the magnitude of each of said first and second intermediate signals is equal to a product obtained by multiplying the absolute value of said wheel speed difference by said gain.

18. A driving force distribution control system according to claim 2 wherein said primary wheels are rear wheels of the vehicle, and said secondary wheels are front wheels of the vehicle.

* * * * *